United States Patent
Motoe

(10) Patent No.: US 7,203,068 B2
(45) Date of Patent: Apr. 10, 2007

(54) ELECTRONIC APPARATUS

(75) Inventor: Hironori Motoe, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 293 days.

(21) Appl. No.: 10/743,191

(22) Filed: Dec. 23, 2003

(65) Prior Publication Data

US 2004/0136364 A1    Jul. 15, 2004

(30) Foreign Application Priority Data

Dec. 26, 2002  (JP)  ............... 2002-378281

(51) Int. Cl.
*H05K 9/00*  (2006.01)
(52) U.S. Cl. .............. 361/729; 361/733; 361/736; 455/296; 455/303; 455/304; 455/349; 725/149
(58) Field of Classification Search ............ None
See application file for complete search history.

(56) References Cited

U.S. PATENT DOCUMENTS 5,903,442 A * 5/1999 Kanai et al. ............ 361/788
5,955,783 A   9/1999 Ben-Efraim et al.
6,151,488 A * 11/2000 Brekelmans ........... 455/150.1

FOREIGN PATENT DOCUMENTS

| JP | 9-97993 | 4/1997 |
|---|---|---|
| JP | 2001-358966 | 12/2001 |
| JP | 2002-73210 | 3/2002 |
| JP | 2004-087708 | 3/2004 |

OTHER PUBLICATIONS

Japanese Office Action dated Feb. 21, 2006 for Appln. No. 2002-378281.
Chinese Office Action dated Apr. 7, 2006 for Appln. No. 200310124313.X.

* cited by examiner

*Primary Examiner*—John B. Vigushin
(74) *Attorney, Agent, or Firm*—Pillsbury Winthrop Shaw Pittman, LLP

(57) ABSTRACT

An electronic apparatus according to the present invention includes two modules which decode high frequency analog signals. Furthermore, each of the modules is provided with an RF section at a position away from the center of the module in either longitudinal direction to carry out radio communications using high frequencies. In this electronic apparatus, the two modules are arranged so that their longitudinal sides extend parallel with each other in opposite directions. The two modules are also misaligned with each other in the longitudinal direction so that the RF sections lie away from each other and so that connectors to which signals subject to noise interference are inputted lie away from each other.

9 Claims, 4 Drawing Sheets

ELECTRONIC APPARATUS

CROSS-REFERENCE TO RELATED APPLICATIONS

This application is based upon and claims the benefit of priority from the prior Japanese Patent Application No. 2002-378281, filed Dec. 26, 2002, the entire contents of which are incorporated herein by reference.

BACKGROUND OF THE INVENTION

1. Field of the Invention

The present invention relates to a mutual interference preventing technique used if a plurality of modules handling high frequency signals are installed.

2. Description of the Related Art

In recent years, electronic apparatus called a home server or the like has started to be popularized which has both a TV viewing function and an Internet browsing function (refer to, for example, Jpn. Pat. Appln. KOKAI Publication No. 2001-358966). Electronic apparatus of this kind is installed in, for example, a living room and connected to personal computers in different rooms via a LAN. Then, on the basis of not only direct operations in the living room using a remote controller or operation buttons but also requests transmitted by the personal computers in the different rooms via the LAN, this electronic apparatus receives and transfers TV broadcast program data via the LAN or acquires and transfers home page data publicized on the Internet, via the LAN.

That is, a user can carry out TV viewing or Internet browsing in his or her own room without the need to provide his or her personal computer with the TV viewing function and the Internet browsing function.

Furthermore, with recent improved image processing techniques or the like, information processing on a computer makes it possible to, for example, view a TV program broadcast on a channel A, while recording a different TV program broadcast on a channel B in the same time slot. Thus, it has been increasingly necessary to also mount a plurality of TV tuners in electronic apparatus of this kind.

For example, a television apparatus with a recording function contains a plurality of TV tuners. In general, these TV tuners are mounted at certain distances from one another so as not to interfere with one another. However, in the previously described electronic apparatus such as a home server, the area in which a printed circuit board is mounted is significantly limited. Accordingly, it is impossible to employ a mounting method such as the one used for television apparatuses with a recording function. Therefore, a certain improvement is required for this electronic apparatus. For example, Jpn. Pat. Appln. KOKAI Publication No. 2002-073210 and Jpn. Pat. Appln. KOKAI Publication No. 09-097993 disclose improvements made to allow the arrangement of a plurality of radio communication modules in a limited mounting area.

However, in Jpn. Pat. Appln. KOKAI Publication No. 2002-073210, two radio communication modules mounted in portable information apparatus are based on different radio communication methods. With the different radio communication methods, the level of the mutual interference between the radio communication modules is much lower than that in the case with the same radio communication method. That is, it is inappropriate to apply this mounting method, which does not take mutual interference into account, to apparatus using the same radio communication method.

Furthermore, in Jpn. Pat. Appln. KOKAI Publication No. 09-097993, two radio communication modules are mounted in a high frequency apparatus by laying one substrate on top of another. It is thus difficult to apply this method to recent electronic apparatus that tends to be thinner.

BRIEF SUMMARY OF THE INVENTION

According to an embodiment of the present invention, an electronic apparatus comprises a circuit board, a splitter mounted on the circuit board, and receiving a signal, a first module mounted on the circuit board, and having a first connecting portion electrically connected to the splitter, and a second module mounted on the circuit board, and having a second connecting portion electrically connected to the splitter, the second connecting portion located in an opposite direction to the first connecting portion.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the embodiments given below, serve to explain the principles of the invention.

DETAILED DESCRIPTION OF THE INVENTION

An embodiment of the present will be described below with reference to the drawings.

Figure 1:
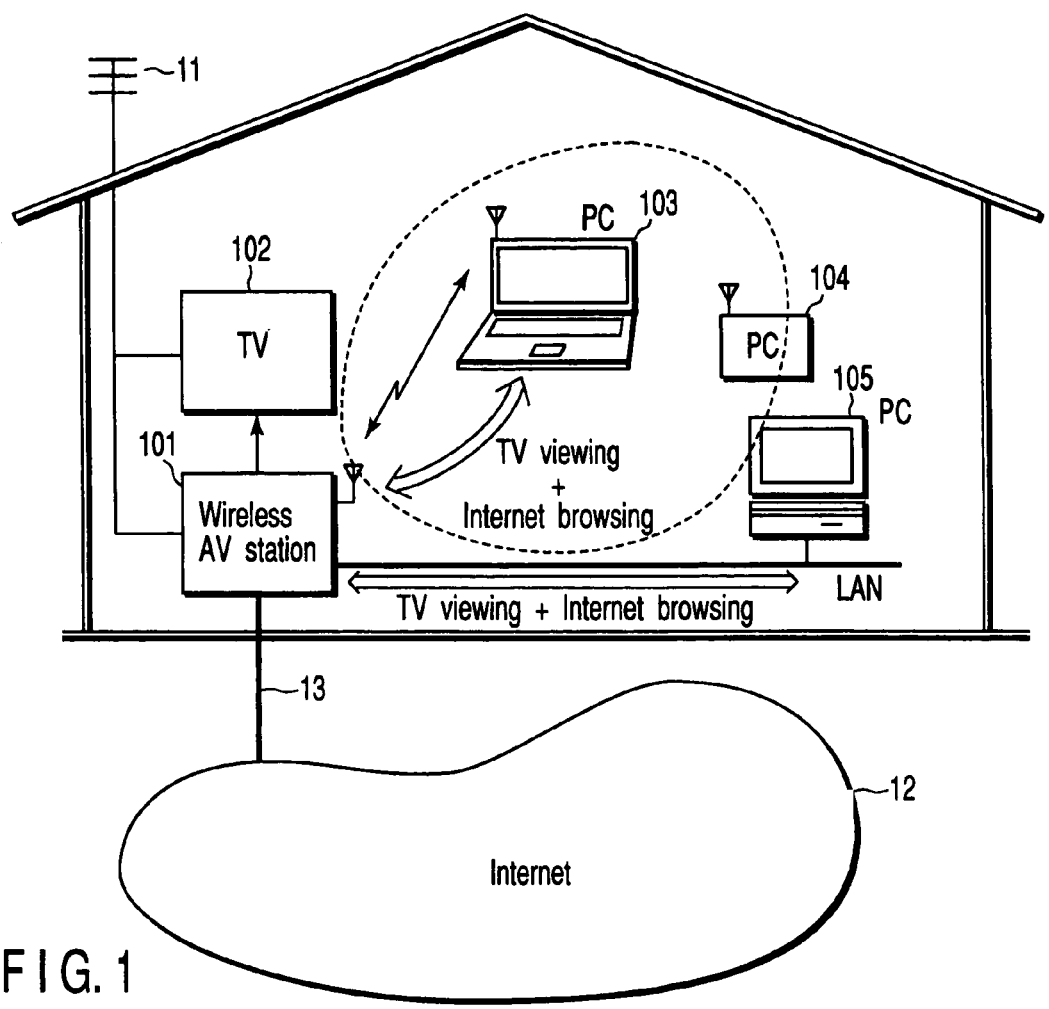
FIG. 1 is a view showing the configuration of a home network system using electronic apparatus (a wireless AV (Audio and Video) station) according to an embodiment of the present invention.

FIG. 1 shows the configuration of a home network system using electronic apparatus (a wireless AV (Audio and Video) station) according to an embodiment of the present invention.

This home network system is composed of, for example, a wireless AV station 101, TV receiver 102, and various information processing terminals such as notebook type personal computers 103 and 104 and a desktop type personal computer 105. The wireless AV station 101 is a radio transmission apparatus functioning as a home network server apparatus. The wireless AV station 101 wirelessly provides the domestic information processing terminals such as the personal computers 103 to 105 with services for the viewing of TV broadcast program data, Internet browsing, and the like.

The wireless AV station 101 is connected to an external global network (external network) such as the Internet 12 via a communication line 13 such as the ISDN, ADSL, or CATV. Moreover, the wireless AV station 101 is connected to the various domestic information processing terminals via a wired or wireless network constituting a home network. The notebook type personal computers 103 and 104 are each provided with a radio communication device and wirelessly connected to the wireless AV station 101. Furthermore, the desktop type personal computer 105 is connected to the wireless AV station 101 via a wired LAN.

The wireless AV station 101 connects each of the personal computers 103 to 105 to the Internet 12 to transmit data between each of the personal computers 103 to 105 and WEB sites on the Internet 12.

An antenna cable connected to a TV broadcast reception antenna 11 installed outdoors is drawn into the house and connected to the TV receiver 102 and the wireless AV station 101. TV broadcast program data can be reproduced by the TV receiver 102 or can be received by the wireless AV station 101. The wireless AV station 101 can wirelessly transmit received TV broadcast program data to the notebook type personal computers 103 and 104 via the wireless LAN. The wireless AV station 101 can also transmit data to the desktop type personal computer 105 via the wired LAN.

Description will be given below of main functions provided by the wireless AV station 101.

Wireless Router Function:

This is a function of wirelessly connecting any of the information processing terminals that can communicate via the wireless LAN, to the Internet 12 to transmit data between the information processing terminal and WEB sites on the Internet 12. Internet browsing can be carried out from anywhere in the house by using the notebook type personal computer 103 or 104 connected to the wireless AV station 101 via the wireless LAN.

TV Function:

This is a function of transmitting TV broadcast program data received by the wireless AV station 101, to any of the information processing terminals connected to the wireless AV station 101 via the wireless or wired LAN. A TV broadcast program on the air can be wirelessly viewed from anywhere in the house by using the notebook type personal computer 103 or 104.

TV Recording Function:

The wireless AV station 101 contains a magnetic disk drive device (hard disk drive; HDD). Accordingly, while wirelessly viewing a TV broadcast program, a user can record this program in the magnetic disk drive device. Furthermore, while transmitting TV broadcast program data recorded in the magnetic disk drive device to one of the information processing terminals, the user can receive another TV broadcast program on the air and record it in the magnetic disk drive device. Moreover, the user can output TV broadcast program data recorded in the magnetic disk drive device, to the TV receiver 102 to view it on a large screen.

Remote Control Function:

Each of the personal computers 103 to 105 can wirelessly control the TV function, TV recording function, and other functions of the wireless AV station 101. Furthermore, the TV function, TV recording function, and other functions of the wireless AV station 101 can be controlled using an exclusive remote control unit used to operate the wireless AV station 101.

Furthermore, the wireless AV station 101 can simultaneously execute the TV function and the TV recording function. Specifically, it is possible to, for example, view a TV program broadcast on a channel A, while recording another TV program broadcast on a channel B. That is, the wireless AV station 101 is what is called double tuner type electronic apparatus.

Figure 2:
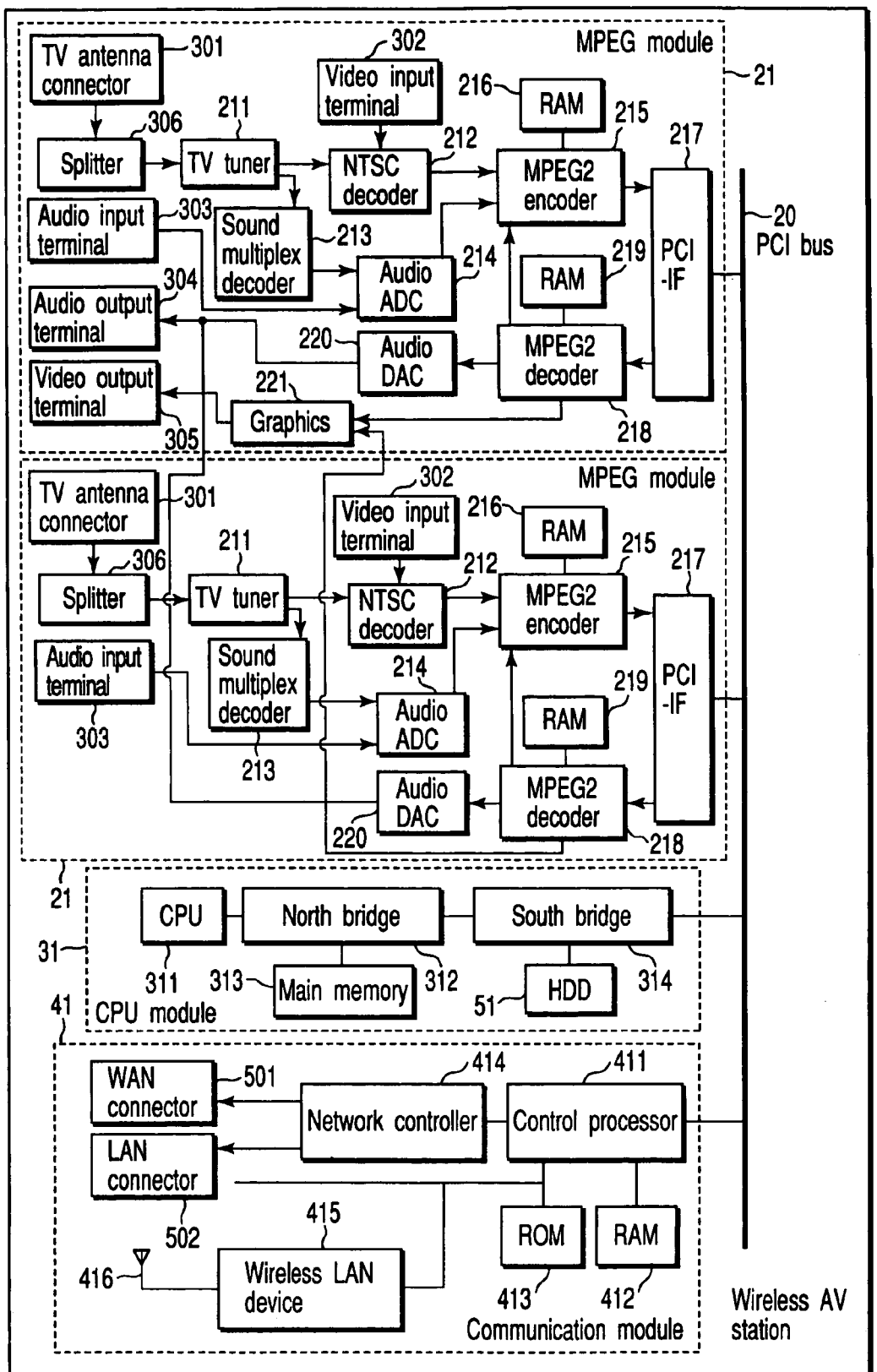
FIG. 2 is a diagram showing the configuration of apparatus in the wireless AV station according to this embodiment.

FIG. 2 is a diagram showing the configuration of apparatus in the wireless AV station 101.

As shown in FIG. 2, the wireless AV station 101 is mainly composed of four components including two MPEG modules 21, a CPU module 31, and a communication module 41. The two MPEG modules 21, the CPU module 31, and the communication module 41 are connected to a bus 20 such as a PCI bus.

Each of the MPEG modules 21 executes a process of receiving TV broadcast program data, an encoding process of compression-encoding the received TV broadcast program data, a decoding process of decoding the compression-encoded TV broadcast program data, and other processes. As shown in FIG. 2, each MPEG module 21 is provided with a TV tuner 211, an NTSC decoder 212, a sound multiplex decoder 215, an audio A/D converter (audio ADC) 214, an MPEG encoder 215, a RAM 216, a PCI bus interface (PCI-IF) 217, an MPEG2 decoder 218, a RAM 219, an audio D/A converter (audio DAC) 220, and other components.

The TV tuner 211 is connected to a TV antenna cable via a TV antenna connector 301 and a splitter 306. The splitter 306 distributes a TV signal inputted from the TV broadcast reception antenna 11 via the TV antenna connector 301, to each of the two TV tuners 211. The TV tuner 211 receives TV broadcast program data transmitted on a channel requested by one of the personal computers 103 to 105 or the remote control unit. The TV tuner 211 receives TV broadcast signals and selects a channel on the basis of the viewing request. A video signal for TV broadcast program data transmitted on a certain channel is received by the TV tuner 211 and then transmitted to the NTSC decoder 212. The NTSC decoder 212 then converts the video signal into digital data. An audio signal is transmitted from the sound multiplex decoder 213 to the audio ADC 214. The audio ADC 214 then converts the audio signal into a digital signal.

The NTSC decoder 212 is also connected to a video input terminal 302 and can thus receive video signals inputted by external video apparatus such as a DVD player or a VCR. A sound multiplex signal superimposed on TV broadcast program data is decoded by the sound multiplex decoder 213 and then transmitted to the audio A/D converter (audio ADC) 214. The audio A/D converter 214 then converts the sound multiplex signal into digital data. The audio A/D converter (audio ADC) 214 is also connected to the audio output terminal 304 and can thus receive audio signals inputted by external video and audio apparatus.

The MPEG2 encoder 215 compression-encodes each of inputted video and audio data. MPEG2 is used for this compression-encoding. The RAM 216 is used by the MPEG2 encoder 215 as a work memory to execute a compression-encoding process. TV broadcast program data received by the TV tuner 211 is compression-encoded by the MPEG2 encoder 215 and converted into an MPEG2 stream.

The PCI bus interface (PCI-IF) 217 connects the MPEG module 21 to the bus 20 and is used to communicate with each of the CPU module 31 and HDD 51 via the bus 20. The PCI bus interface (PCI-IF) contains a group of registers that can be accessed by the CPU module 31. Operations of the TV tuner 211 and MPEG2 encoder 215 are controlled in accordance with commands set in the group of registers by the CPU module 31.

The MPEG2 decoder 218 decodes TV broadcast program data compression-encoded into an MPEG2 format. For example, if compression-encoded TV broadcast program data recorded in the HDD 51 is to be viewed using the TV receiver 102, the compression-encoded TV broadcast program data read from the HDD 51 is transmitted to the MPEG2 decoder 218 via the PCI bus interface 217. The MPEG2 decoder 218 then decodes (expands) the TV broadcast program data. The RAM 219 is used by the MPEG2 decoder 218 as a work memory to execute a decoding process. Operations of the MPEG2 decoder 218 are also controlled in accordance with commands set in the group of registers by the CPU module 31.

Video data decoded by the MPEG2 decoder 218 is transmitted to, for example, the TV receiver 102 via graphics 221 and then a video output terminal 305. Audio data decoded by the MPEG2 decoder 218 is converted into an analog signal by the audio D/A converter (audio DAC) 220 as required. The converted signal is then outputted from an audio output terminal 304 to external audio/video apparatus.

Moreover, according to the present embodiment, TV broadcast program data decoded by the MPEG2 decoder 218 can be transmitted to the MPEG2 encoder 215. The MPEG2 encoder 215 can then execute a compression-encoding process again. This operation is used for a down convert process of converting a transmission rate (bit rate) for compression-encoded TV broadcast program data recorded in the HDD 51 into a particular transmission rate for radio transmissions.

Specifically, the transmission rate (bit rate) for TV broadcast program data obtained by a compression-encoding process executed by the MPEG2 encoder 215 varies depending on the quality of images (low, standard, and high image quality) in TV broadcast program data to be recorded in the HDD 51. If the high quality is selected, TV broadcast program data compression-encoded at a very high transmission rate is recorded in the HDD 51. In this case, in a radio communication band, the TV broadcast program data may not be transmitted in real time. Then, a down convert process is automatically executed to reduce the transmission rate for the TV broadcast program data to be wirelessly transmitted, to a particular one for radio transmissions.

The CPU module 31 controls the TV tuner 211, MPEG2 encoder 215, and MPEG2 decoder 218 of the MPEG module 21. The CPU module 31 also controls data writes to the HDD 51 and data reads from the HDD 51. Furthermore, through communications with the communication module 41, the CPU module 31 receives a command for TV viewing transmitted by one of the personal computers 103 to 105 and transmits TV broadcast program data to be sent to one of the personal computers 103 to 105, to the communication module 41. The CPU module 31 is composed of a CPU 311, a north bridge 312 connecting a CPU bus for the CPU 311 and the PCI bus 20 together, and a main memory 313.

The communication module 41 is a communication control device that can operate independently as a LAN router. The communication module 41 is configured to connect wirelessly to the personal computers 103 and 104 and is also connected to the personal computer 105 via the wired LAN. In response to a request transmitted by one of the personal computers 103 to 105, the communication module 41 connects this personal computer 103 to 105 to the Internet 12 to transmit data between the personal computer 103 to 105 and the Internet 12. In this case, the processes for the transmission of data between the personal computer 103 to 105 and the Internet 12 are all executed within the communication module 41, whereas the CPU module 31 is not used.

The communication module 41 is provided with a control processor 411, a RAM 412, a ROM 413, a network controller 414, a wireless LAN device 415, a WAN connector 501, a LAN connector 502, and the like.

The WAN connector 501 is a broadband terminal used to transmit and receive data to and from the Internet 12, and is connected to the communication line 13 via, for example, a modem. The LAN connector is connected to the domestic wired LAN.

The network controller 414 is a network control device that controls the transmission of data between the communication module 41 and the Internet 12 via the WAN connector 501 and the transmission of data between the communication module 41 and the domestic wired LAN via the LAN connector 502. The wireless LAN device 415 is a radio communication device that transmits and receives data to and from the personal computers 103 and 104. The wireless LAN device 415 communicates wirelessly with the personal computers 103 and 104 via the antenna 416. The wireless LAN device 415 conforms to a standard such as IEEE802.11b or IEEE802.11a.

The control processor 411 controls the network controller 414 and the wireless LAN device 415 and thus the transmission of data between the personal computers 103 to 105 and the Internet 12. Specifically, the control processor 411 includes an IP masquerade function, a NAT function, and a DHCP function which are required to allow the communication module 41 to operate as a wireless router. Moreover, the control processor 411 is connected to the PCI bus 20. The control processor 411 has a function of notifying, via the PCI bus 20, the CPU 311 of a request (command) for TV viewing which request is received from the personal computer 103 or 104 via the wireless LAN device 415. The control processor 411 can also notify, via the PCI bus 20, the CPU 311 of a request (command) for TV viewing received from the personal computer 105 on the wired LAN via the network controller 414.

Moreover, the control processor 411 has a function operating if it receives TV broadcast program data transferred by the CPU 311 via the PCI bus 20, to transmit the TV broadcast program data to the requesting personal computer via the wireless LAN device 415 or the network controller 414. In this case, the process of transmitting the TV broadcast program data to the requesting personal computer is executed concurrently with the transmission of data between this personal computer and the Internet 12.

For example, it is assumed that while the personal computer 103, which can be wirelessly connected to the communication module 41, is carrying out Internet browsing, TV program data requested by the personal computer 103 is wirelessly transmitted to the personal computer 103. Then, the control processor 411 controls the wireless LAN device 415 so as to transmit wirelessly contents data received from a WEB server on the Internet 12 and TV broadcast program data compression-encoded by the MPEG module 21, to the personal computer 103 in a time division manner. Specifically, the control processor 411 multiplexes the contents data and the compression-encoded TV broadcast program data and wirelessly transmits the multiplexed contents data and TV broadcast program data to the personal computer 103 in a time division manner. By thus independently transmitting contents data and TV broadcast program data to the personal computer 103, the personal computer 103 can simultaneously display the contents data and the TV broadcast program data using corresponding application programs.

Furthermore, the corresponding application programs can be used to vary freely the displayed positions and sizes of windows for the contents data and TV broadcast program data.

The above functions of the control processor 411 are realized by firmware stored in the ROM 413.

Figure 3:
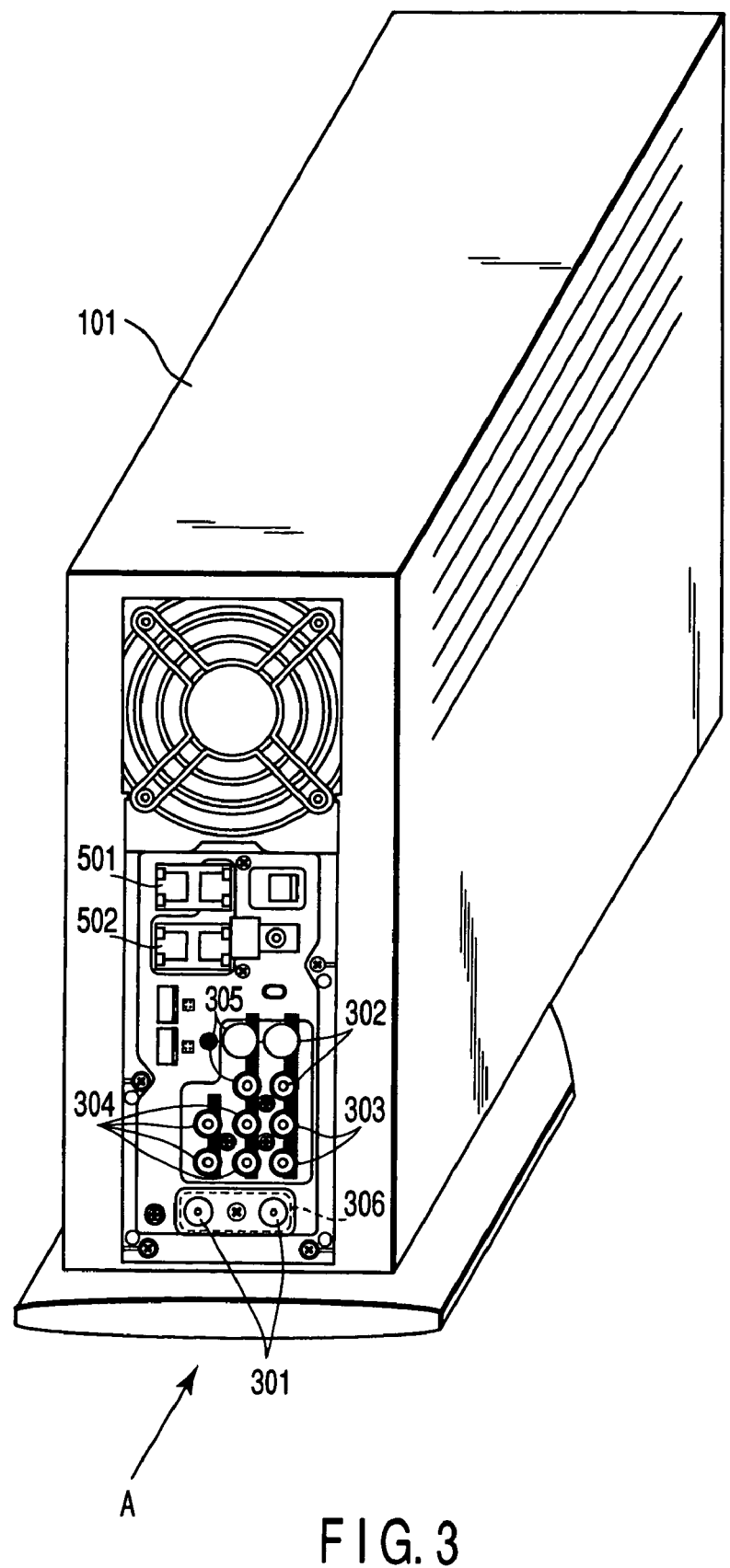
FIG. 3 is a view showing the wireless AV station according to this embodiment as viewed from its rear.

FIG. 3 shows the appearance of the wireless AV station 101 as viewed from its rear.

As shown in FIG. 3, the wireless AV station 101 has a vertically installed housing called a tower type or the like. The rear surface of the wireless Av station 101 is provided with a radiating fan and a connector for a network connection, as well as the splitter 306, used to connect each of the TV tuners 211 of the two MPEG module 21, shown in FIG. 2, to the TV antenna cable.

Since the vertically installed wireless AV station 101 is installed next to, for example, the TV receiver 102, it is preferably made as thin as possible. Furthermore, to make the area on the substrate well-organized, the two TV tuners 211 must be provided adjacent to an end of the substrate which is closer to the TV antenna connector 301.

On the other hand, the TV tuners 211 of the two MPEG modules 21 each comprise a radio communication function based on the same radio communication method. Accordingly, if the TV tuners 211 are provided adjacent to each other on the same substrate, they are likely to interfere with each other. Thus, the wireless AV station 101 according to this embodiment is characterized in that the two TV tuners 211, i.e. the radio communication modules can be arranged within a limited mounting area while limiting mutual interference to within an allowable range. This point will be described below.

Figure 4:
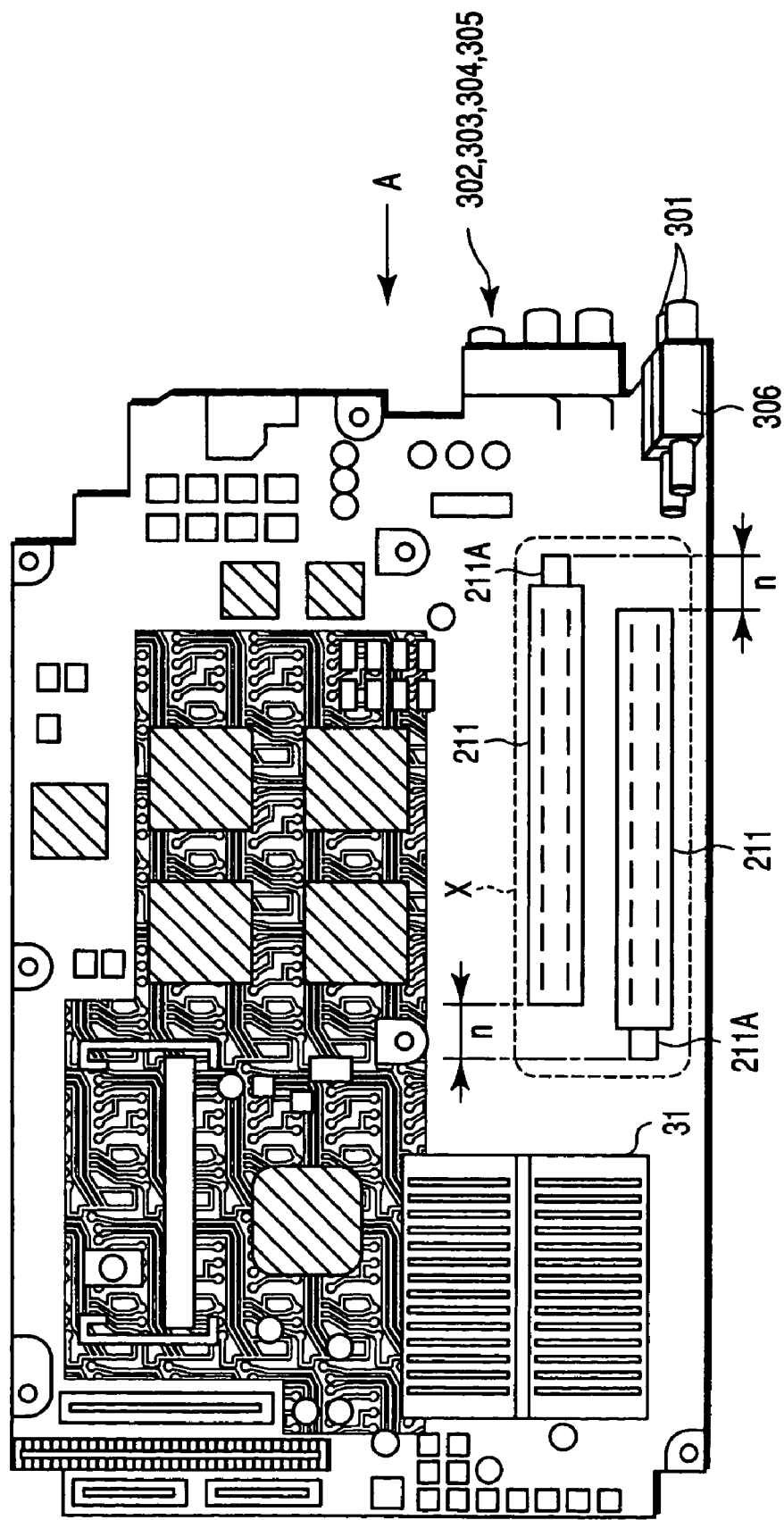
FIG. 4 is a view showing an example in which the components of the wireless AV station according to this embodiment are arranged on the same substrate.

FIG. 4 is a view showing an example in which the components of the wireless AV station 101 are arranged on the same substrate.

As shown in FIG. 4, the CPU module 31, the core of the wireless AV station 101, is provided on the substrate installed in the wireless AV station 101. Furthermore, on the substrate, the two tuners 211, i.e. the radio communication modules each comprising the radio communication function based on the same radio communication method, are provided adjacent to each other within a limited mounting area X at the end of the substrate which is closer to the splitter 306.

A connector 211A is provided at one end of each tuner 211 to connect to the splitter 306 via a cable. That is, in the prior art, the two tuners 211 are commonly arranged adjacent to and parallel with each other in the same direction so that the connectors 211a lies opposite the corresponding TV antenna connectors 301. In contrast, in the wireless AV station 101, the connectors 211A are arranged so as to extend in the opposite directions, i.e. one of the connectors 211A is located away from the TV antenna connectors 301 so that the two tuners 211 lie adjacent to and parallel with each other and opposite each other in a longitudinal direction. At the same time, in the wireless AV station 101, the two tuners 211, which are configured with a rectangular parallelepiped shape, are arranged so as to be intentionally misaligned with each other by a distance n in the direction in which the connectors 211A extend.

Moreover, in the present embodiment, the tuner 211 mounted closer to the splitter 306 is arranged so that its connector 211A sits further from the splitters 306. On the other hand, the other tuner 211 is arranged so that its connector 211A sits closer to the splitters 306. This is because the tuner 211 mounted closer to the splitters 306 cannot be connected to the corresponding splitter 306 easily during manufacturing when its connector 211A is located too close to the splitters 306. If a predetermined distance can be set between the splitters 306 and the tuners 211, the tuner 211 mounted closer to the splitters 306 may be arranged so that its connector 211A lies closer to the splitters 306, while the other tuner 211 may be arranged so that its connector 211A lies further from the splitters 306.

This arrangement is employed in order to limit, to within an allowable range, the mutual interference between the radio communication modules each comprising the radio communication function based on the same radio communication method, i.e. the radio communication modules that are likely to interfere with each other, if they must be provided adjacent to each other within the limited mounting area X. Now, with reference to FIGS. 5A and 5B, description will be given of the principle of realization of the limitation of the mutual interference between two tuners 211 to within an allowable range, based on the above arrangement.

Figure 5A:
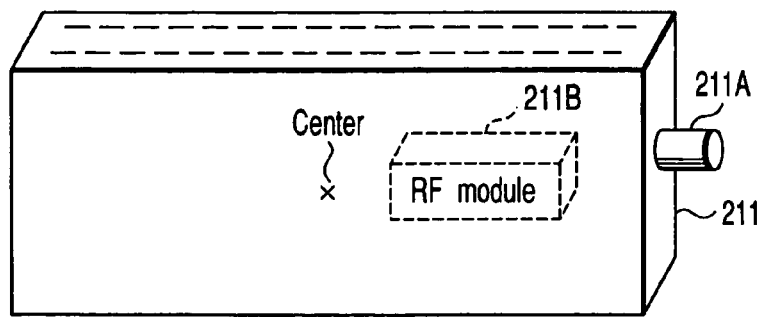
FIGS. 5A and 5B are views illustrating the principle of realization of the limitation of the mutual interference between two tuners to within an allowable range, in the wireless AV station according to this embodiment.
Figure 5B:
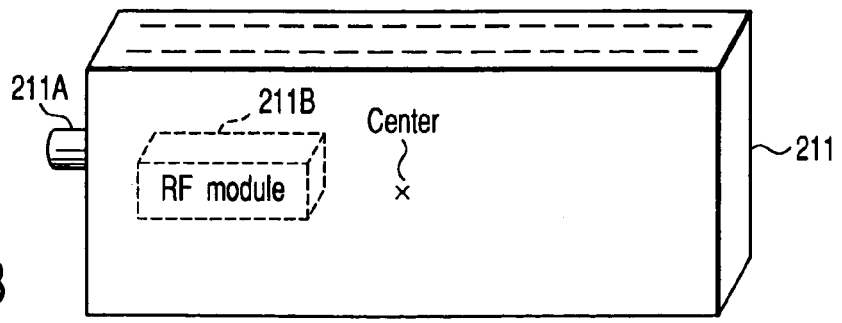

In the wireless AV station 101, an RF module 211B of each tuner 211 is provided between the center of the tuner 211 and the corresponding connector 211A as shown in FIGS. 5A and 5B. Accordingly, by arranging one of the tuners 211 as shown in FIG. 5A while arranging the other as shown in FIG. 5B, a distance is set between the RF modules 211B, contained in the respective tuners 211, the distance being required to reduce the mutual interference between the tuners 211. Furthermore, a larger distance can be set by arranging the two tuners 211 so that they are misaligned with each other in the direction in which the connectors 211A extend.

Specifically, in the wireless AV station 101, the appropriate distance is set between the TV tuners 211 by providing the RF module 211B of each TV tuner 211 between the center of the TV tuner 211 and the connector 211A and arranging the the two tuners 211 on each of the MPEG modules 21 so that the connectors 211A lie adjacent to and parallel with each other so as to extend in the opposite directions and so that the tuners 211 are misaligned with each other in the direction in which the connectors 211A extend.

Thus, the two tuners 211 can be arranged within the limited mounting area while limiting the mutual interference between the two tuners 211 to within an allowable range. This makes it possible to minimize the area of the substrate which is sandwiched between the two tuners 211 and which is thus not worth utilizing and to make the remaining area on the substrate well-organized to increase the utilization of the area. It is thus possible to make the wireless AV station 101 thinner and smaller.

The TV tuner 211 has been described above as an example of the radio communication module. The method according to the present invention is not limited to the TV tuner but is applicable to any radio communication modules handling analog signals and comprising radio communication functions based on the same radio communication method.

Furthermore, in the examples described above, the TV tuners 211 are arranged so that the connectors 211A lie adjacent to and parallel with each other so as to extend in the opposite directions and so that the TV tuners 211 are misaligned with each other in the direction in which the connectors 211A extend. However, depending on the position of the RF module 211B in the TV tuner 211, it may be unnecessary to misalign the TV tuners 211 with each other in the direction in which the connectors 211A extend.

Moreover, if for example, the RF module 211B is provided between the center of the TV tuner 211 and its end opposite to the connector 211A, similar effects are produced by misaligning the TV tuners 211 with each other in the direction opposite to the one in which the connectors 211A extend.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic apparatus comprising:
   a circuit board;
   a splitter mounted on the circuit board, and receiving a signal;
   a first module mounted on the circuit board, and having a first connecting portion electrically connected to the splitter; and
   a second module mounted on the circuit board, and having a second connecting portion electrically connected to the splitter, the second connecting portion located in an opposite direction to the first connecting portion.

2. The electronic apparatus according to claim 1, wherein the first module and the second module are rectangularly parallelepiped shaped and are arranged so that their longitudinal sides extend parallel with each other in opposite directions.

3. The electronic apparatus according to claim 1, wherein the first module and the second module each have a an RF module which is provided at a position away from a center of the module in either longitudinal direction.

4. The electronic apparatus according to claim 1, wherein the first module and the second module are arranged at an end of the circuit board.

5. An electronic apparatus comprising:
   a circuit board;
   a first module mounted on the circuit board, and having a first input portion to which an analog signal is inputted;
   a second module mounted on the circuit board, and having a second input portion to which an analog signal is inputted the second input portion being located in an opposite direction to the first input portion,
   wherein the first module and the second module are shaped like a rectangular parallelpiped and are arranged so that their longitudinal sides extend parallel with each other in opposite directions and the first module and the second module each have a an RF module which is provided at a position away from a center of the module in either longitudinal direction.

6. The electronic apparatus according to claim 5, wherein the first module and the second module are arranged at an end of the circuit board.

7. An electronic apparatus comprising:
   a circuit board;
   a splitter mounted on the circuit board, and inputting an analog signal and splitting the analog signal to a plurality of output ends;
   a first module mounted on the circuit board, and having a first connecting portion electrically connected to the output end of the splitter; the first connecting portion located in direction toward the output end of the splitter; and
   a second module mounted on the circuit board, and having a second connecting portion electrically connected to the output end of the splitter, the second connecting portion located in an opposite direction to the first connecting portion.

8. The electronic apparatus according to claim 7, wherein the first module and the second module are rectangularly parallelepiped shaped and are arranged so that their longitudinal sides extend parallel with each other in opposite directions.

9. The electronic apparatus according to claim 7, wherein the splitter is provided at an end of the circuit board, and the second module is provided closer to the end of the circuit board than the first module.

* * * * *